No. 840,776. PATENTED JAN. 8, 1907.
F. LACKNER.
NUT MACHINE.
APPLICATION FILED FEB. 18, 1905.

7 SHEETS—SHEET 2.

WITNESSES:
Herbert Bradley.
Fred Kirchner.

INVENTOR
Frederick Lackner
by Christy & Christy Atty's

No. 840,776. PATENTED JAN. 8, 1907.
F. LACKNER.
NUT MACHINE.
APPLICATION FILED FEB. 18, 1905.

7 SHEETS—SHEET 3.

WITNESSES:
Herbert Bradley.
Fred Kirchner.

Frederick Lackner
INVENTOR
by Christy & Christy
Atty's

No. 840,776.  
PATENTED JAN. 8, 1907.  
F. LACKNER.  
NUT MACHINE.  
APPLICATION FILED FEB. 18, 1905.

7 SHEETS—SHEET 4.

WITNESSES:  
Herbert Bradley  
Fred Kirchner

Frederick Lackner  
INVENTOR  
By Christy & Christy  
Atty's

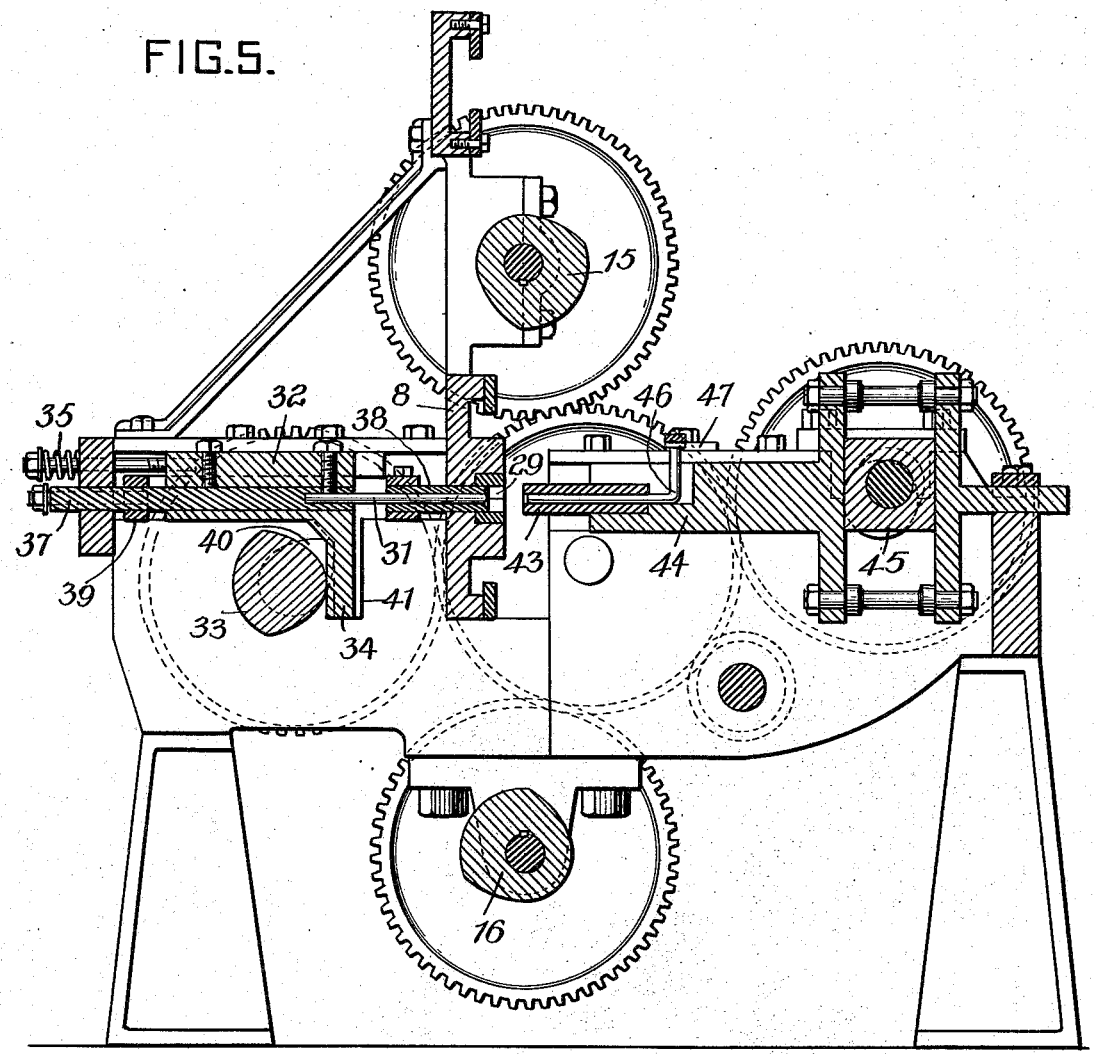

No. 840,776. PATENTED JAN. 8, 1907.
F. LACKNER.
NUT MACHINE.
APPLICATION FILED FEB. 18, 1905.
7 SHEETS—SHEET 6.
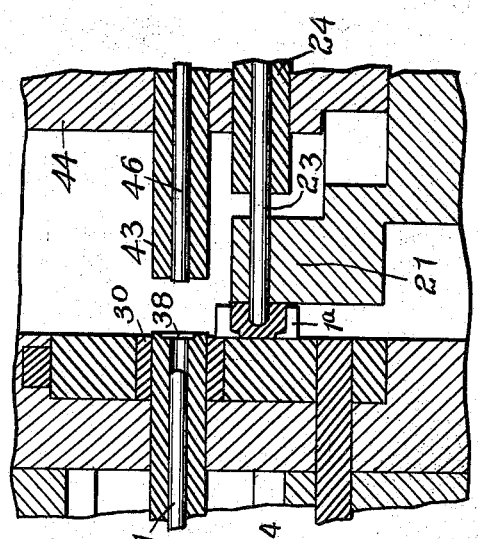
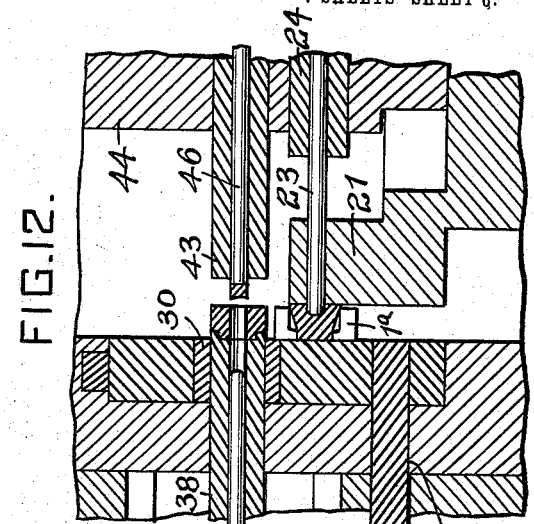
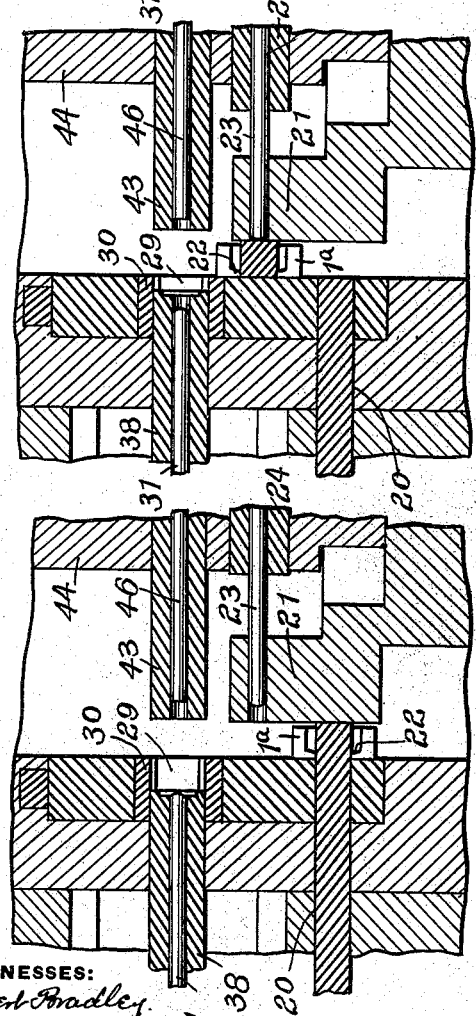
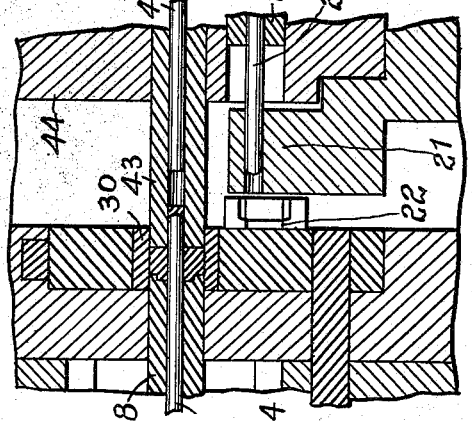
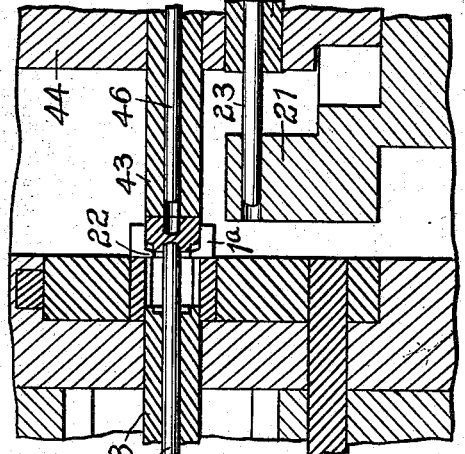
WITNESSES:
Herbert Bradley
Fred Kirchner
INVENTOR
Frederick Lackner
by Christy & Christy Atty's No. 840,776. PATENTED JAN. 8, 1907.
F. LACKNER.
NUT MACHINE.
APPLICATION FILED FEB. 18, 1905.
7 SHEETS—SHEET 7.
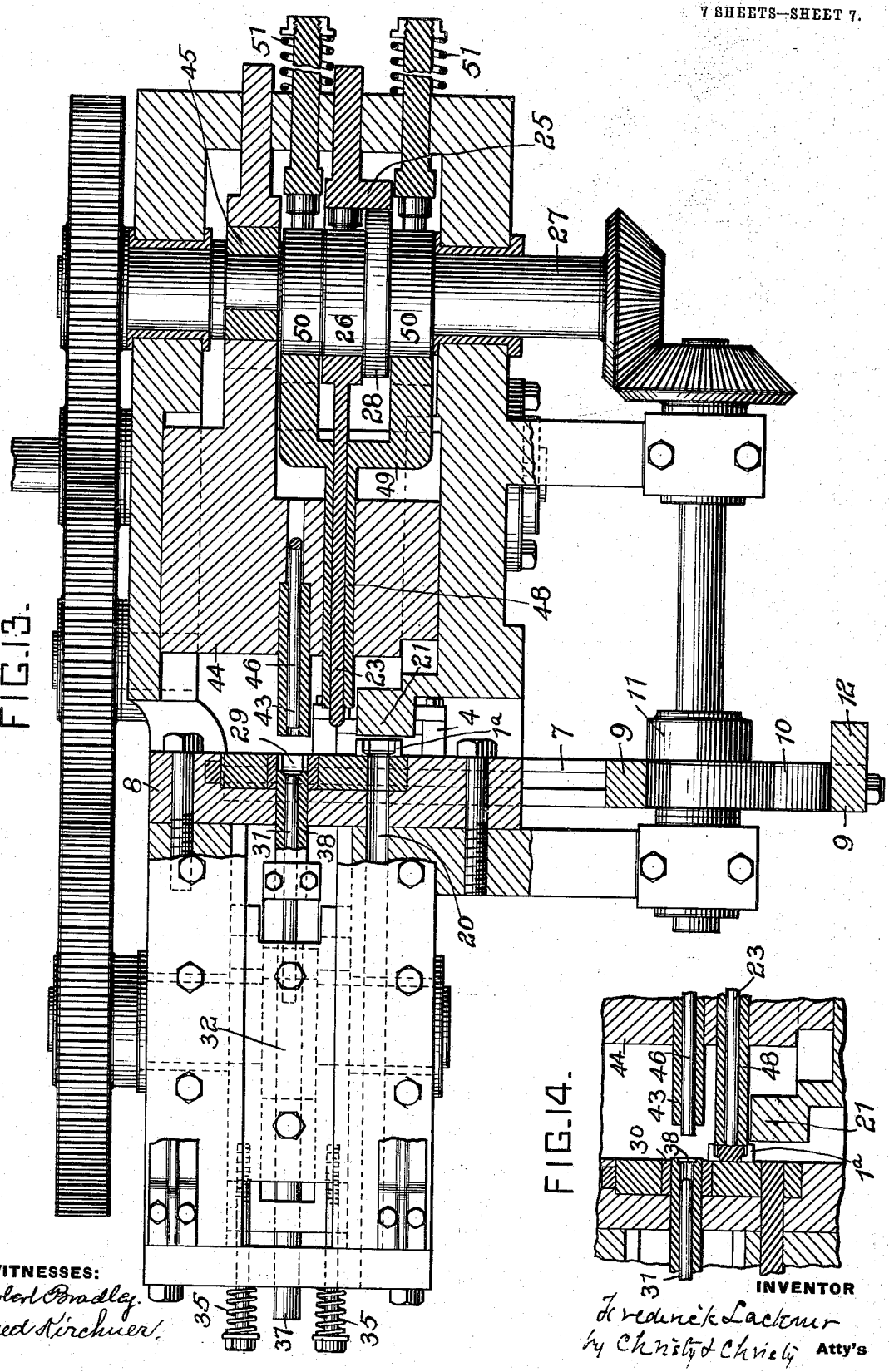
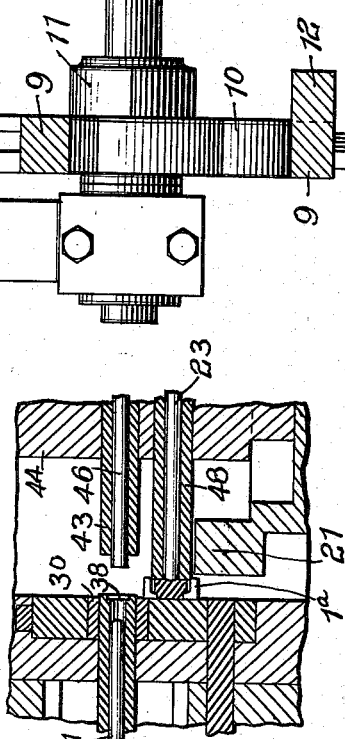
WITNESSES:
Herbert Bradley
Fred Kirchner
INVENTOR
Frederick Lackner
by Christy & Christy Atty's

UNITED STATES PATENT OFFICE.

FREDERICK LACKNER, OF PITTSBURG, PENNSYLVANIA, ASSIGNOR TO NEELY NUT & BOLT COMPANY, OF PITTSBURG, PENNSYLVANIA.

NUT-MACHINE.

No. 840,776.     Specification of Letters Patent.     Patented Jan. 8, 1907.

Application filed February 18, 1905. Serial No. 246,323.

*To all whom it may concern:*

Be it known that I, FREDERICK LACKNER, a citizen of the United States, residing at Pittsburg, in the county of Allegheny and State of Pennsylvania, have invented or discovered certain new and useful Improvements in Nut-Machines, of which improvements the following is a specification.

The invention described herein relates to certain improvements in the manufacture of nuts, and has for its object a construction and combination of parts whereby a blank is caused to assume its final form and is enlarged by the displacement of metal in the formation of the transverse opening therethrough, thereby effecting a considerable saving of material.

The invention is herein more fully described and claimed.

Figure 1:
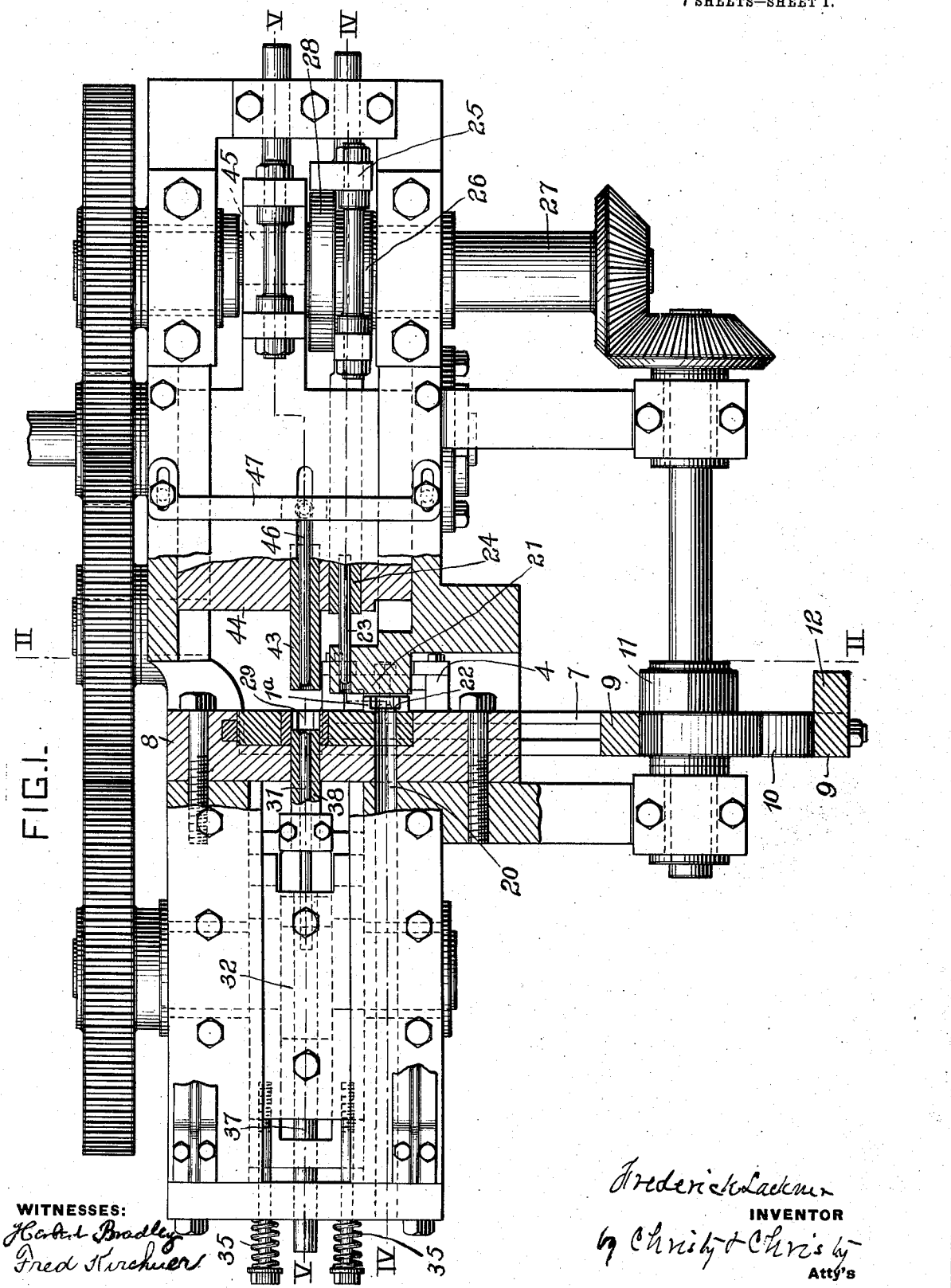
Figure 2:
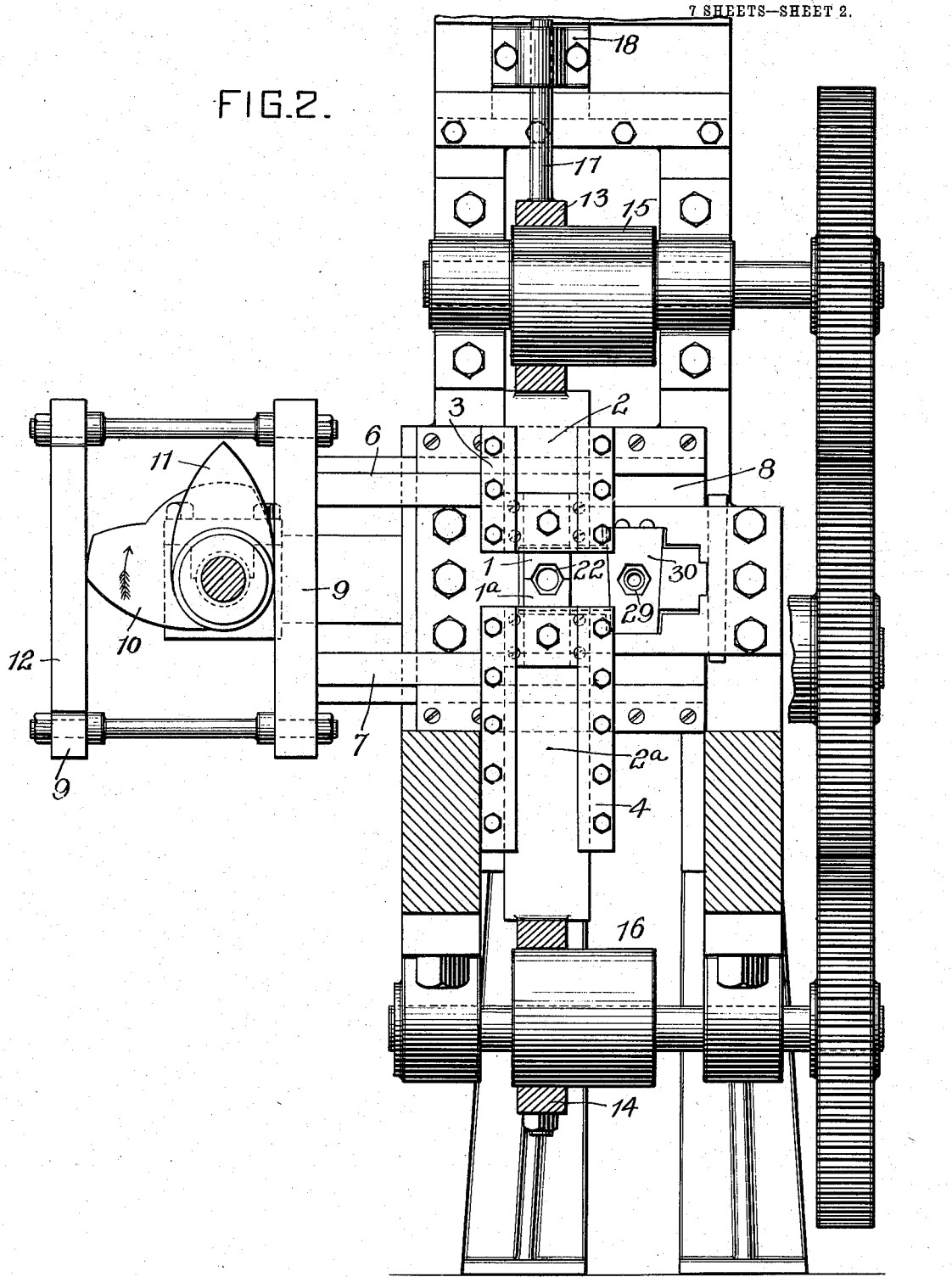
Figure 3:
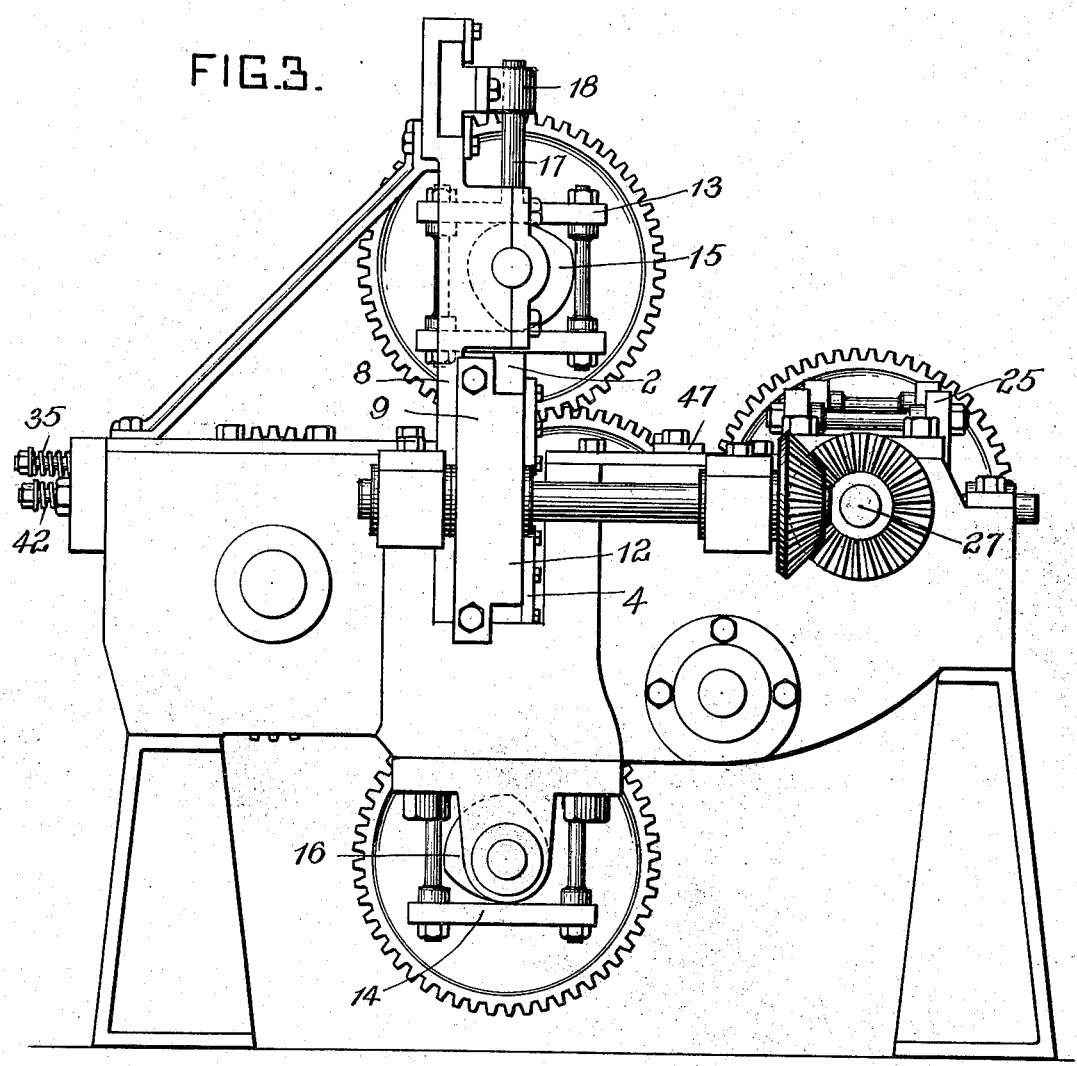
Figure 4:
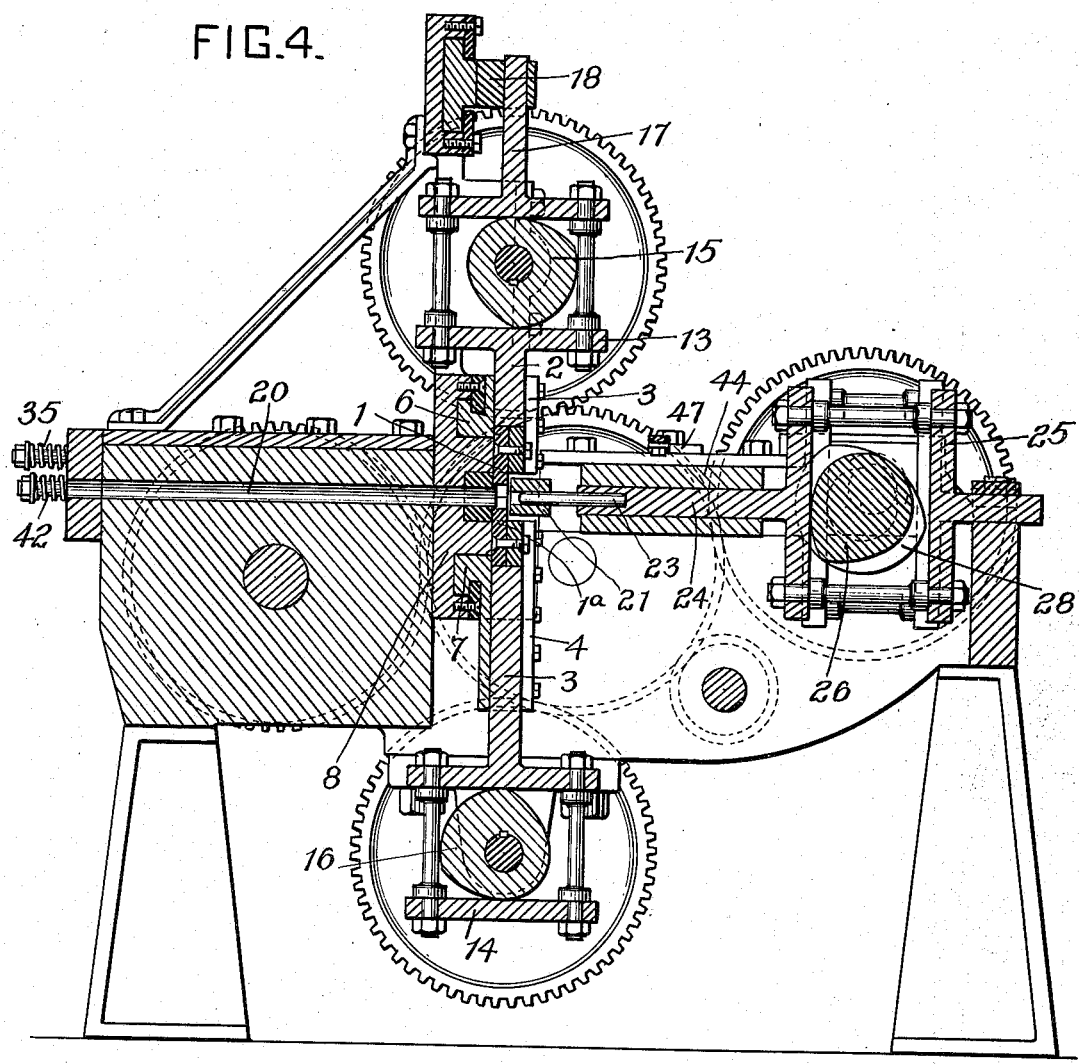
Figure 6:
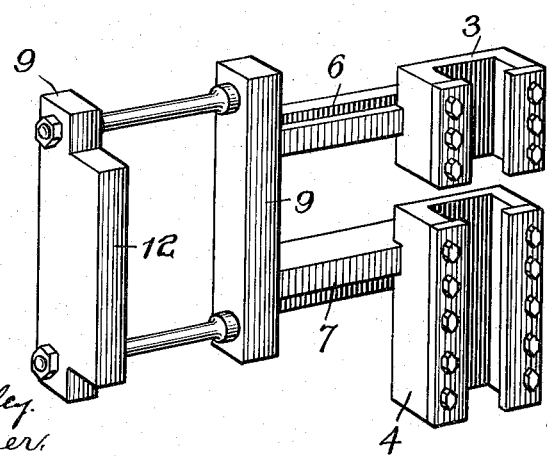

In the accompanying drawings, forming a part of this specification, Figure 1 is a plan view, partly in section, of my improved machine. Fig. 2 is a sectional elevation, the plane of section being indicated by the line II II of Fig. 1. Fig. 3 is a side elevation of the machine. Figs. 4 and 5 are sectional elevations on planes indicated, respectively, by the lines IV IV and V V, Fig. 1. Fig. 6 is a perspective view of the jaw-carrier. Figs. 7, 8, 9, 10, 11, and 12 are sectional detailed views illustrating the various steps in the formation of the nut. Fig. 13 is a sectional plan view illustrating a modification of the machine, and Fig. 14 is a sectional detail view illustrating a step in the operation of forming nuts by the machine shown in Fig. 13.

In the practice of my invention the shaping-matrix is formed in the movable jaws 1 and $1^a$, which are secured to slides 2 and $2^a$, arranged to reciprocate back and forth in guides 3 and 4, formed on or secured to horizontally-arranged bars 6 and 7, as clearly shown in Figs. 2, 4, and 5. These bars are mounted in suitable guideways on the supporting-bed 8, arranged transverse of the machine. These reciprocating bars, which with the guides 3 and 4 form the carriers for the slides 2 $2^a$ and jaws 1 $1^a$, are secured to a yoke 9, surrounding the cams 10 and 11, which are constructed and arranged to impart the desired motions to the carrier. The cam 10 is so constructed that it will move the carrier step by step toward the right. In this movement three rests are provided for operation upon the blank held within the jaws 1 and $1^a$. The return movement of the carrier to the left for the operation on another blank is effected by the cam 11, which is adapted to operate on a lateral extension 12 on the rear wall of the yoke 9, as clearly shown in Figs. 1 and 6. The heads or slides 2 and $2^a$ are connected, respectively, to yokes 13 and 14, in which operate the cams 15 and 16. These cams, as clearly shown in Fig. 2, are made of a length so as to be capable of holding the slides inwardly during the transverse shifting of the carrier by the cam 10, as heretofore described. It is preferred to form a stem or extension 17 on the yoke 13, said stem projecting up through a suitable bearing on a guiding-slide 18, adapted to move back and forth with the yoke.

The bar or rod from which the nuts are to be formed having a transverse dimension less than that of the nut is fed by hand or otherwise through a passage or opening 20 in the frame of the machine against the stop 21. This feeding of the bar occurs when the carrier, with the jaws 1 and $1^a$, is at its extreme position to the left in Fig. 2 and the jaws are open. As soon as the feed has occurred the cams 15 and 16 operate to close the jaws around the bar, and when it is desired to form a nut with a projection or central enlargement on one end the jaws are provided with inwardly-projecting edges 22, adapted to close around the bar, as clearly shown in Figs. 1, 7, to 12. As soon as the jaws have closed in the manner stated the cam 10 comes into operation and moves the carrier, with the jaws 1 and $1^a$, to the right in Fig. 2, thereby severing the portion of the bar inclosed within the jaws from the bar in a plane outside of the edges 22, the edge of the hole or passage 20 and the inwardly-projecting portions 22 of the jaws 1 and $1^a$ operating as shears to effect the cutting off. This movement of the cam 10 and the parts shifted thereby carries the jaws with the inclosed blank in front of or into alinement with the punch 23. During this movement of the jaws and blank the latter is held within the matrix by the stop or abutment 21. The punch 23 is secured to the reciprocating head 24, provided at its rear end with a yoke 25, surrounding a cam 26 on the shaft 27. This cam 26 operates on the front bar of the yoke to move the head 24 to the left in Fig. 4, while a second cam 28 operates on the lateral extension of the rear bar of yoke 25 to withdraw the reciprocating head and punch at the proper time. As will be seen by reference to Fig. 9, this punch 23 does not pass entirely through the blank, but only partially or sufficiently far as to effect a displacement of metal sufficient to cause a lateral spreading of the nut to completely fill the matrix. The punch 23 is now withdrawn by the operation of the cam 28, and by the operation of the cam 10 the jaws and the partially-completed nut are moved another step to the right in Fig. 2. By this movement the blank is brought into alinement with the final shaping-box 29, preferably formed in a removable piece 30. As soon as the blank reaches this position a punch 31 is moved forward, so as to enter the blank a short distance or sufficiently far to support the blank when the jaws 1 and 1ª are separated, such separation occurring as soon as the punch has entered the blank. This punch is secured to a slide 32, mounted in suitable bearings in the frame of the machine, and is moved forward by means of a cam 33, arranged to operate against a downward projection 34 from the slide. The rearward movement of the slide is effected by means of springs 35, surrounding rods extending rearwardly from the slide through the end of the machine. For convenience in inserting and removing the punch the latter is secured in a removable rod or stem 37, adapted to be inserted through the frame of the machine into the slide 32, where it is held into position by means of suitable set-screws. This punch 31 operates through a header or compressing-die 38, which is secured in a sliding frame 39. This frame surrounds the slide 32, an opening being formed through the slide 39 for this purpose. The slide 39 is moved forward to operate the die 38 by means of a cam 40, operating on a downward extension 41 from the slide. The return movement of the slide is effected by means of springs 42.

As soon as the punch 31 has entered the blank, as stated, the jaws 1 and 1ª are separated and a die 43 is moved forward to force the blank entirely over the punch 31 and into the box 29. By this movement of the die 43 the small wall of metal remaining in the nut is removed and forced into a longitudinal opening in the die 43. The die 43 may continue its movement to the left in Fig. 10, so as to compress the nut between its end and the end of the die 38, whose forward end is arranged in the box and is adapted to be shifted forward therein by the cam 40. As soon as the die 43 has completed its movement to the left in Fig. 10 it is withdrawn and the die 38 is moved to the right, following the die 43, and forcing the nut out of the box 29. The die 43 is secured to a slide 44, provided with a yoke at its rear end surrounding the operating-cam 45. In order to remove the metal forced into the die 43, a rod 46 is arranged within the longitudinal opening in the die and is secured to a cross-bar 47 of the machine, so that when the die is drawn back to the right this wall-metal punching will be removed therefrom.

As soon as the jaws 1 and 1ª have separated, as heretofore stated, the carrier is moved back to the initial position by cam 11, as shown in Fig. 2, and the bar is fed forward, so that its end will project through the jaws against the stop 21. The operation heretofore described is then repeated on another blank, and when the first blank has been finished, as heretofore stated, the second blank has reached its second position, as shown in Fig. 12.

If desired, the lateral spreading effected by the punch 23 may be assisted by a transverse compression of the whole body of the blank. To this end I provide a die 48 to operate upon the blank in its second position, as shown in Figs. 13 and 14. When this construction is used, the stop or abutment-wall 21 is cut off sufficiently to allow of the operation of this die 48. The punch 23 is arranged to operate through the die 48, which is secured to a two-part yoke 49, operated by cams 50 on the shaft 27. The return movement of this yoke and die is effected by springs 51. The cams 26 and 50 are so arranged as to move forward together against the blank and effect the desired compression; but the cam 26 is designed to produce a further or additional movement to the punch 23 and cause the same to enter the blank and complete the lateral spreading thereof to fill the matrix, as shown in Fig. 14.

It will be understood from the foregoing that in this operation the spreading of the blank to the desired dimensions for the completed nut is effected almost wholly by the displacement of the metal incident to the formation of the hole through the nut. The only waste in this operation is the small wall of metal removed in the final operation by the punch 31.

I claim herein as my invention—

1. In a nut-machine the combination of a shear edge or wall gripping-jaws having a shaping-matrix, means for closing said jaws around a bar or rod, a reciprocating punch at one side of the line of feed of the bar or rod, and means for shifting said jaws when in a closed position transversely of the shear edge or wall and into the line of movement of the punch, substantially as set forth.

2. In a nut-machine the combination of a shear edge or wall gripping-jaws having a shaping-matrix, means for closing said jaws around a bar or rod, means for shifting the jaws when in a closed position transversely of the shear edge, and means for laterally spreading the blank within and while held between said jaws, substantially as set forth.

3. In a nut-machine the combination of a shear edge, gripping-jaws having a shaping-matrix, means for closing said jaws around a bar or rod, means for shifting the jaws when closed transversely of the shear edge to complete the severance of the bar or rod and to shift the blank into position for further operation, a punch adapted to spread and partially perforate the blank and means for reciprocating the punch.

4. In a nut-machine the combination of a shear edge or wall, gripping-jaws having a shaping-matrix, means for closing the jaws around a bar or rod, means for shifting the jaws when closed transversely of the shear edge to complete the severance of the bar or rod and to shift the blank into position for further operations, a punch for spreading and partially perforating the blank, means for reciprocating the punch and means for completing the perforation or opening through the blank.

5. In a nut-machine the combination of a shear edge or wall gripping-jaws having a shaping-matrix, means for closing the jaws around a bar or rod, means for shifting the jaws when closed transversely of the shear edge to complete the severance of the bar or rod and to shift the blank into position for further operations, a spreading-punch, a supporting-punch, means for reciprocating said punches, and a reciprocating die for forcing the blank over the supporting-punch and thereby completing the perforation of the nut, substantially as set forth.

6. In a machine for making nuts, the combination of a shear edge, a spreading-punch, a supporting-punch, a reciprocating die for forcing a blank over the supporting-punch, gripping-jaws having a shaping-matrix, means for closing the jaws around a bar or rod, and means for successively shifting the jaws when closed across the shear edge and into position in front of the spreading and supporting punches, substantially as set forth.

7. In a machine for making nuts the combination of a carrier provided with guides, means for reciprocating the carrier, slides arranged in said guides and provided with jaws having a shaping-matrix, and means for opening and closing said jaws and holding them closed during the movement of the carrier in one direction, substantially as set forth.

8. In a machine for making nuts the combination of a carrier provided with guides, slides arranged in said guides, means for shifting said slides, means for moving the carrier step by step in one direction and means for returning the carrier to normal position by a continuous movement, substantially as set forth.

9. In a machine for making nuts, the combination of a shear edge gripping-jaws having a shaping-matrix, means for closing said jaws around a bar or rod, means for shifting said jaws when in a closed position across the shear edge and a stop or abutment extending from feed position in the direction of the movement of the jaws, substantially as set forth.

10. In a machine for making nuts, the combination of gripping-jaws having a shaping-matrix, means for closing said jaws around a bar or rod, a punch and die for spreading the blank, means for reciprocating the punch and die, means for shifting the jaws when in a closed position into line with the punch and die and means for imparting a further operative movement to the punch, substantially as set forth.

11. In a nut-machine the combination of jaws having shaping-matrices provided with inwardly-projecting edges, means for closing the jaws around the bar from which the nuts are to be formed, means for severing the bar outside of the plane of the inwardly-projecting edges of the matrix and means for spreading the blank to fill the matrix.

12. In a nut-machine, the combination of gripping-jaws having a matrix, means for moving said jaws toward and from each other, a punch adapted to enter a blank and support the same when the jaws are open, means for operating said punch and means for shifting the jaws into alinement with the punch.

In testimony whereof I have hereunto set my hand.

FREDERICK LACKNER.

Witnesses:
CHARLES BARNETT,
FRED KIRCHNER.